United States Patent

[11] 3,566,976

[72] Inventor Evert Jan Heersink
Hinsdale, Ill.
[21] Appl. No. 652,798
[22] Filed July 12, 1967
[45] Patented Mar. 2, 1971
[73] Assignee International Harvester Company
Chicago, Ill.

[54] DISC BLADE-HOLDING DEVICE
4 Claims, 4 Drawing Figs.
[52] U.S. Cl. .................................................. 172/601, 172/776
[51] Int. Cl. ............................................................. A01b 21/08
[50] Field of Search ........................................... 172/438, 528, 536, 558, 561—3, 599, 144, 165, 166; 7/15, 16; 269/95—98; 24/(Inquired); 248/(Inquired)

[56] References Cited
UNITED STATES PATENTS

| 347,745 | 8/1886 | Stoddard | 172/561 |
|---|---|---|---|
| 1,204,306 | 11/1916 | Offerman | 172/561 |
| 451,421 | 4/1891 | LaDow | 172/528 |
| 2,074,418 | 3/1937 | Opolo | 172/536 |

Primary Examiner—Robert E. Pulfrey
Assistant Examiner—Alan E. Kopecki
Attorney—Noel G. Artman ABSTRACT: A holding device for use in assembling and disassembling and rigidly securing the discs of the harrow gang on an arbor bolt comprises a clamp releasably connected to the supporting beam or gang bar including a pair of clamping elements extending downwardly and clasping the upper edge of one of the disks, a lug affixed to one of the clamping elements projecting in one direction therefrom engaging the lower face of the gang bar.

PATENTED MAR 2 1971  3,566,976

EVERT JAN HEERSINK
INVENTOR
EVERT HEERSINK

ATTY

DISC BLADE-HOLDING DEVICE

This invention relates to a clamp or jig for use in assembling the discs of harrow gangs and the like.

A harrow gang comprises a series of discs mounted on an elongated arbor bolt or shaft threaded at one end, the disc being separated by spacers and the whole secured together by a nut on the threaded end of the bolt bearing against the end disc. Until the present invention it has been necessary for an operator, in applying torque to the arbor bolt nut, to hold the end disc in one hand to eliminate any radial play in the discs while applying a wrench to the nut. In large, heavy duty harrows particularly it becomes impossible for one man to perform these operations, and an object of this invention is the provision of novel means for holding a gang of discs in proper relationship to each other and to the arbor bolt while torquing the nut securing the discs and spacers together as a unit.

Another object of the invention is the provision of novel clamping means forming a connection between the gang bar and the end disc of a harrow gang for holding the gang of discs assembled on an arbor bolt to permit the assembly to be secured together tightly as a unit.

Other objects and advantages of the invention will become clear from the following detailed description when read in conjunction with the accompanying drawings, wherein.

Figure 1:
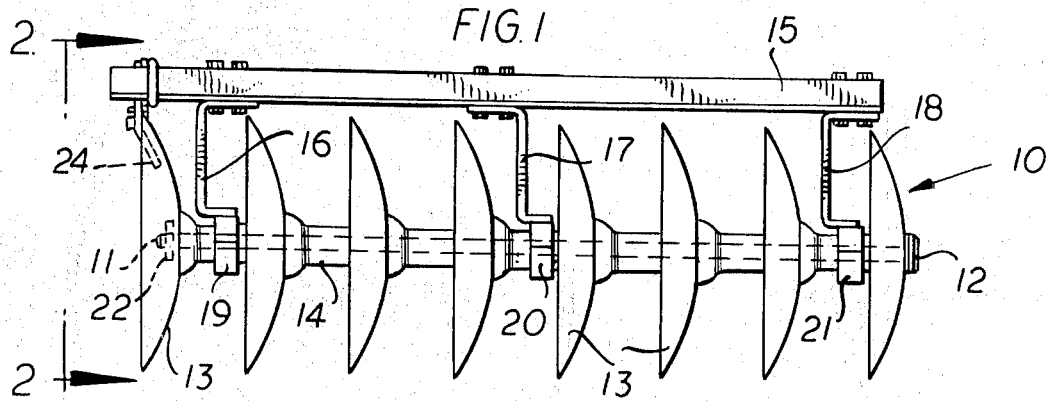
FIG. 1 is a view in side elevation of a disc gang assembled with the aid of the clamping means of this invention.

In the drawings the numeral 10 designates a harrow gang comprising an elongated arbor bolt 11 threaded at one end and having a head 12 at its other end, and upon which are mounted a plurality of spaced discs 13 separated by spacer spools 14.

The disc and arbor bolt assembly is suspended from a gang bar 15 by spaced hangers 16, 17, and 18 secured at their upper ends to the gang bar and having bearings 19, 20, and 21, respectively, at their lower ends to rotatably receive spacers 14. A nut 22 is threaded on the end of arbor bolt 11, and the clamping means of this invention is shown applied to end disc 13 adjacent the nut 22 to hold the discs and spacers on the arbor bolt in properly aligned relationship with axial and radial play removed from the discs and spacers while nut 22 is tightened with a wrench.

The clamping means of this invention is designated by the numeral 23 and includes a main clamping element 24 in the form of a bar upset on its long axis to provide bent ends 25 and 26. While the clamping structure 23 may be applied between the gang bar 15 and any one of the discs 13, the assembler finds it most convenient to apply the clamp to the end disc adjacent nut 22.

It has been impractical for an assembler to attempt to hold the disc and spool assembly against rotation in the direction in which nut 22 is tightened, the services of another assembler being required to apply a wrench, usually a pipe wrench, to one of the spacers 14 in the reverse direction to the torque applied to nut 22. The clamping structure 23 of this invention makes it possible for a single assembler, by applying the clamp to one of the discs, to apply the high torque required to nut 22 to complete the gang assembly operation.

As shown in the drawings, the lower portion of the main clamping element 24 engages the inner rim portion of the disc and is secured by a pin 27 and a bolt 28 to another clamping element 29 having a lower bent portion 30 engageable with the convex outer face of disc 13. Nut 31 permits a strong frictional grip to be applied to the disc to hold the entire assembly against rotation, and pin 27 is retained by a cotter 32.

Clamping structure 23 includes means by which it is quickly and releasably anchored to gang bar 15, a rod 33 being laterally bent at one end for reception in an opening 34 in the upper end 26 of main clamping element 24 and is pivotally retained therein against displacement by a cotter 35. The other end of rod 33 is bent to form a hook 36 embracing one side of gang bar 15, the other side of which is engaged by the edges of elements 24 and 29 of the clamp.

Figure 2:
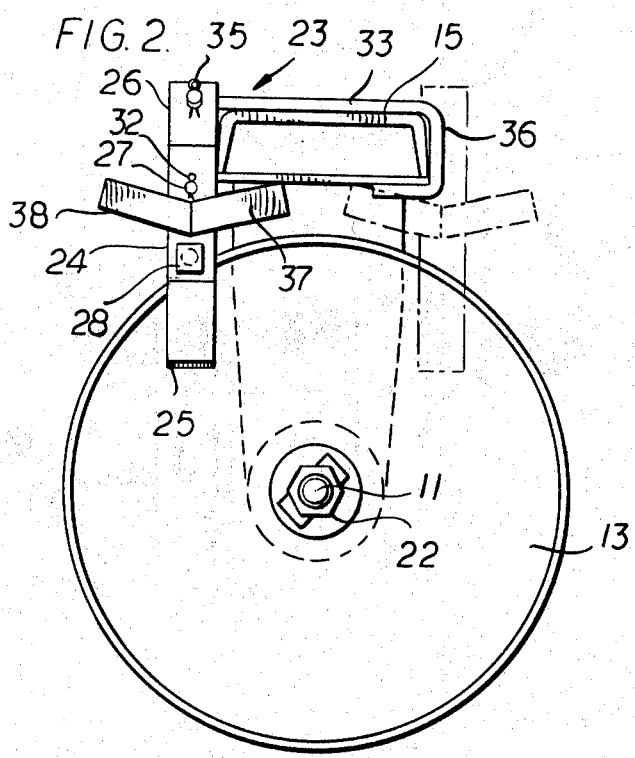
FIG. 2 is an enlarged end view taken on the line 2—2 of FIG. 1.
Figure 3:
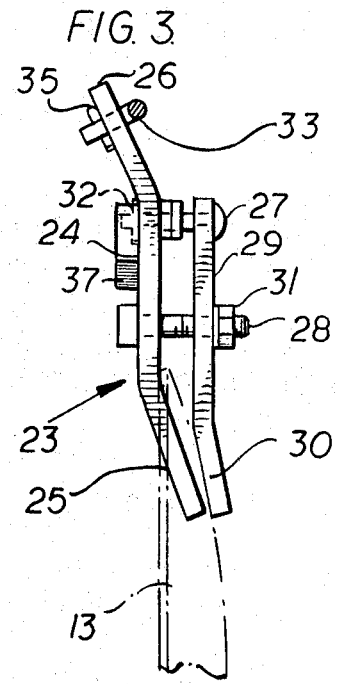
FIG. 3 is a sectional side elevation, on an enlarged scale, of the clamping structure shown in FIGS. 1 and 2.
Figure 4:
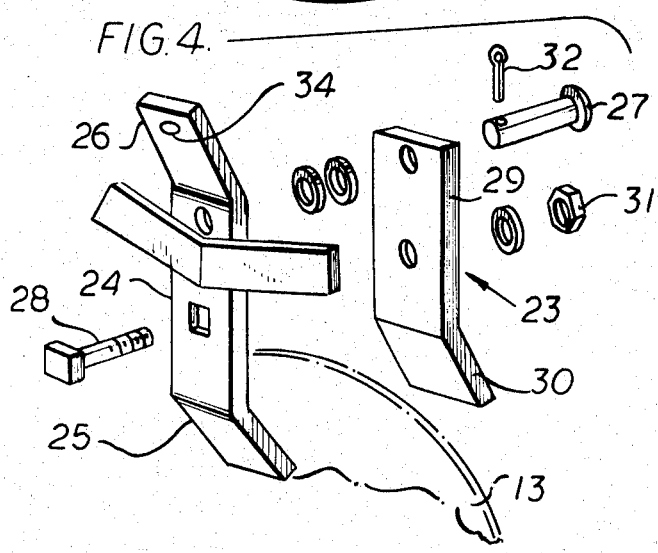
FIG. 4 is an exploded view of the clamping assembly of this invention.

Further bracing of the clamp to prevent rotation of the disc and spool assembly relative to gang bar 15 is provided by a lug 37 affixed, as by welding, to main clamping element 24, and angled upwardly for engagement with the underside of gang bar 15, as indicated in FIG. 2.

When nut 22 is to be removed and the disc gang disassembled, the clamp is moved to the opposite side of the gang bar or beam 15, as indicated in dotted lines in FIG. 2, bar 33 being removed from opening 34 and its position reversed so that hook portion 36 will embrace the opposite side of the gang bar. In this position another lug 38 affixed to main clamping element 24 projects therefrom oppositely and symmetrically with respect to lug 37 for engagement with the underside of the gang bar.

It is believed that the construction and operation of the novel disc gang-holding device of this invention will be clearly understood from the foregoing description. It should likewise be understood that the invention has been described in its preferred embodiment and that modifications may be made therein without departing from the spirit of the invention.

I claim:

1. A device for use in assembling a harrow gang having a plurality of earth-working discs mounted with spacers therebetween on an elongated arbor bolt and suspended from a horizontal gang bar wherein a nut at the threaded end of the bolt engages an end disc and is tightened to simultaneously rigidly secure all of the discs and spacers together on the bolt, comprising clamping means connecting the gang bar to one of said discs to hold the discs and spacers against rotation preparatory to tightening said nut, said clamping means including a main body portion engageable with one side of said disc, a movable clamping element engageable with the other side of said disc and releasably connected to said main body portion to hold the disc therebetween, shoulder means on the main body portion engageable with the underside of said gang bar and a hook member pivoted on said main body portion and swingable to and from a position in locking engagement with said gang bar.

2. The invention set forth in claim 1, wherein said hook member embraces the upper part of said bar and the main body portion of said clamping means engages one side of said bar.

3. The invention set forth in claim 2, wherein said hook member is reversible and said main body portion and said movable clamping element are optionally disposable in another position with said main body portion engageable with the other side of said bar, another shoulder means being provided on said main body portion for engagement with the underside of said bar in said other position.

4. In a harrow gang including a horizontal gang bar having first and second sides, hangers depending therefrom, a plurality of discs having spacer spools therebetween suspended from said hangers, an elongated arbor bolt extending axially through said spacers and discs and threaded at one end, a nut threaded on said threaded end of the arbor bolt, means for use in securing the discs and spools together on the arbor bolt comprising, removable clamping means operably connected to the gang bar and in grasping relationship with a portion of at least one of said discs for holding the disc against rotation while the nut is tightened on the arbor bolt, said clamping means having a pair of relatively stiff clamping members adapted to grasp said portion of said one of said disc, means interconnecting said clamping members to grasp said one of said discs, shoulder means affixed to and projecting from at least one side of one of said clamping members and engageable with the lower face of said gang bar and a holding member in the form of a rod pivotally connected to said one of said clamping members and having a hook portion adopted to embrace one of said first or second sides.